United States Patent
Kruys et al.

(10) Patent No.: US 8,040,791 B2
(45) Date of Patent: Oct. 18, 2011

(54) COORDINATED CHANNEL CHANGE IN MESH NETWORKS

(75) Inventors: Johannes Petrus Kruys, Harmelen (NL); Xiaohong Gong, Milpitas, CA (US); Jyoti Raju, San Jose, CA (US); Christopher G. Meil, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 918 days.

(21) Appl. No.: 12/030,584

(22) Filed: Feb. 13, 2008

(65) Prior Publication Data

US 2009/0201851 A1  Aug. 13, 2009

(51) Int. Cl.
*H04L 12/26* (2006.01)
*H04L 12/28* (2006.01)
*H04W 4/00* (2009.01)
*G06F 15/16* (2006.01)
*G06F 11/00* (2006.01)

(52) U.S. Cl. ........ 370/217; 370/255; 370/338; 370/408; 709/237; 709/252; 714/2

(58) Field of Classification Search .................. 370/217, 370/255, 338, 408; 709/237, 252; 714/2
See application file for complete search history.

(56) References Cited

U.S. PATENT DOCUMENTS

| | | | | |
|---|---|---|---|---|
| 6,684,331 B1 * | 1/2004 | Srivastava | ..................... | 713/163 |
| 6,925,064 B2 | 8/2005 | Hester et al. | | |
| 7,285,487 B2 * | 10/2007 | DeHon et al. | ................. | 438/618 |
| 7,420,952 B2 * | 9/2008 | da Costa et al. | ............. | 370/338 |
| 7,505,450 B2 * | 3/2009 | Castagnoli | ................... | 370/350 |
| 7,899,027 B2 * | 3/2011 | Castagnoli et al. | ........... | 370/350 |
| 2005/0259571 A1 * | 11/2005 | Battou | ........................ | 370/217 |
| 2006/0187950 A1 * | 8/2006 | Bou-Diab et al. | ............ | 370/432 |
| 2006/0215583 A1 * | 9/2006 | Castagnoli | .................... | 370/254 |
| 2006/0242457 A1 | 10/2006 | Roy et al. | | |
| 2007/0124443 A1 | 5/2007 | Nanda et al. | | |
| 2008/0013514 A1 * | 1/2008 | Lee et al. | ...................... | 370/338 |
| 2008/0069036 A1 * | 3/2008 | Lee et al. | ...................... | 370/328 |
| 2008/0084855 A1 * | 4/2008 | Rahman | ....................... | 370/342 |
| 2009/0116411 A1 * | 5/2009 | Castagnoli et al. | ........... | 370/256 |
| 2009/0129273 A1 * | 5/2009 | Zou | .............................. | 370/235 |

FOREIGN PATENT DOCUMENTS

| WO | 00-16532 A | 3/2000 |
|---|---|---|
| WO | 2006-031488 A | 3/2006 |
| WO | 2007-055994 A | 5/2007 |

OTHER PUBLICATIONS

International Search Report and Written Opinion for PCT/US2009/031031, Jan. 26, 2010.
Cervelló, Gerard et al., "Dynamic Channel Selection (DCS) Scheme for 802.11," *IEEE* 802.11-00/195, pp. 1-7, Jul. 12, 2000.

\* cited by examiner

*Primary Examiner* — Alpus H Hsu
(74) *Attorney, Agent, or Firm* — Baker Botts L.L.P.

(57) ABSTRACT

A coordinated channel change system. In particular implementations, a method includes receiving a prepare-to-change message, wherein the prepare-to-change message indicates instructions to prepare to change channels and includes a designated channel, and forwarding the prepare-to-change message to one or more child nodes. The method also includes receiving a ready-to-change message from the one or more child nodes, and transmitting a change-to-channel message to the one or more child nodes, wherein the change-to-channel message indicates instructions to switch to the designated channel. The method also includes receiving an acknowledgement message from the one or more child nodes, and changing to the designated channel.

11 Claims, 8 Drawing Sheets

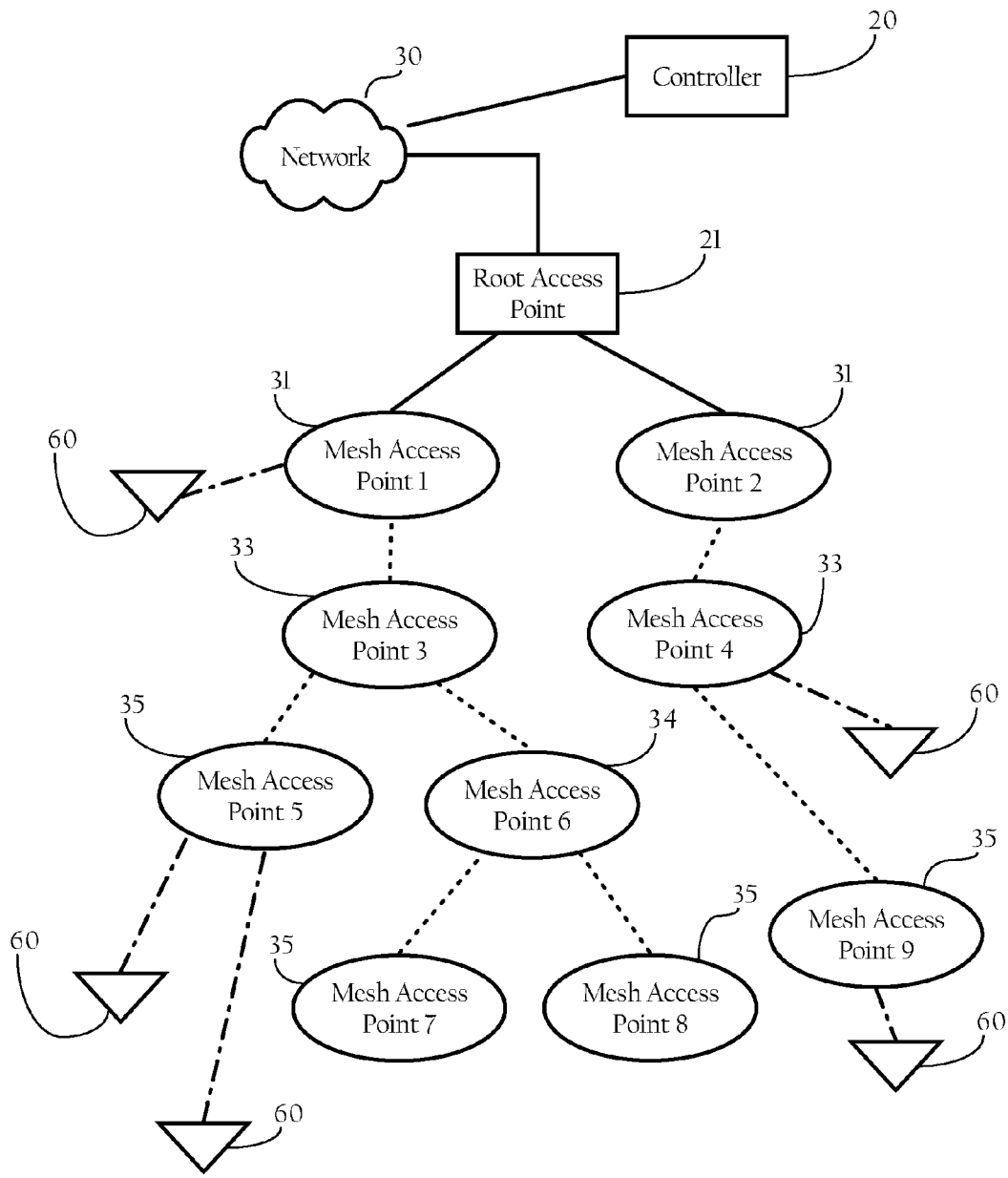
Fig._1

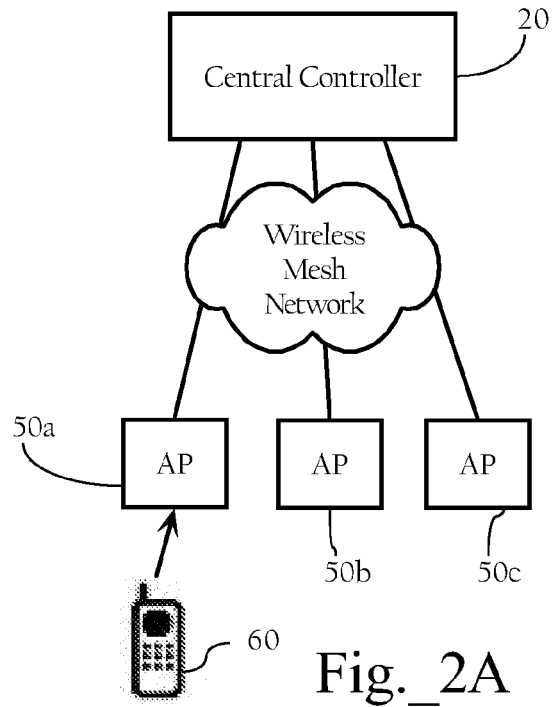
Fig._2A
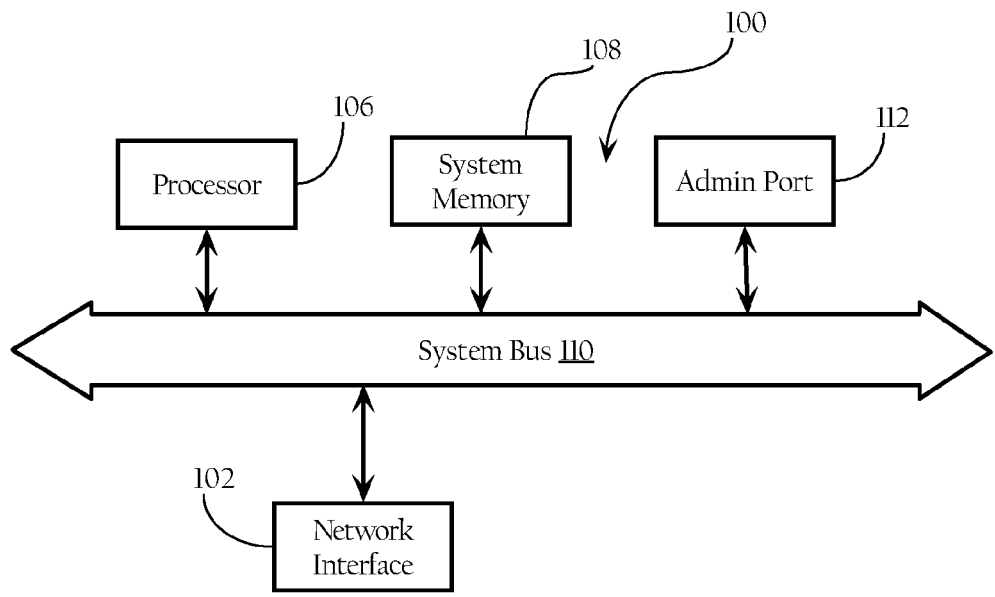
Fig._2B

Fig._4

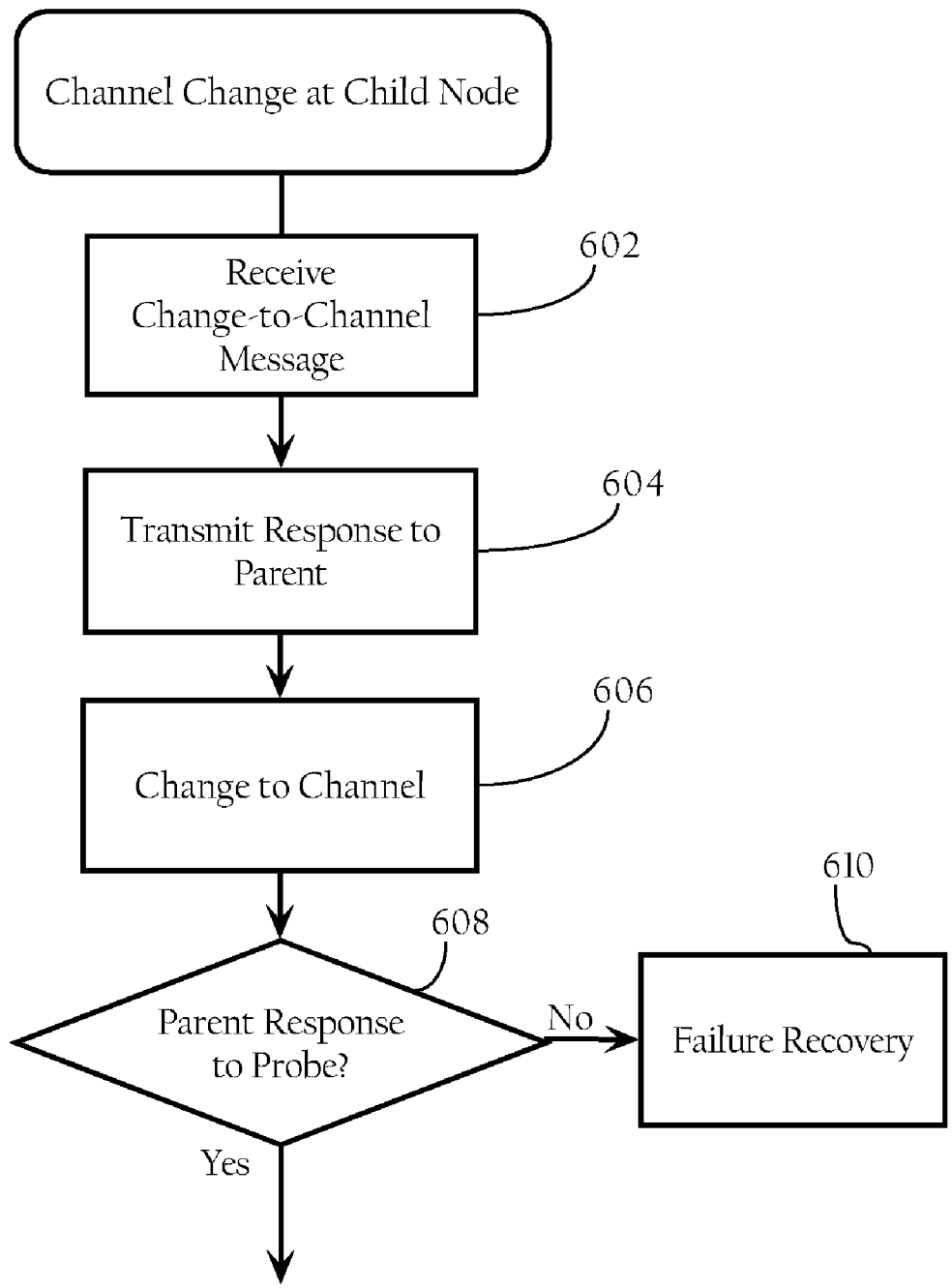
Fig._6

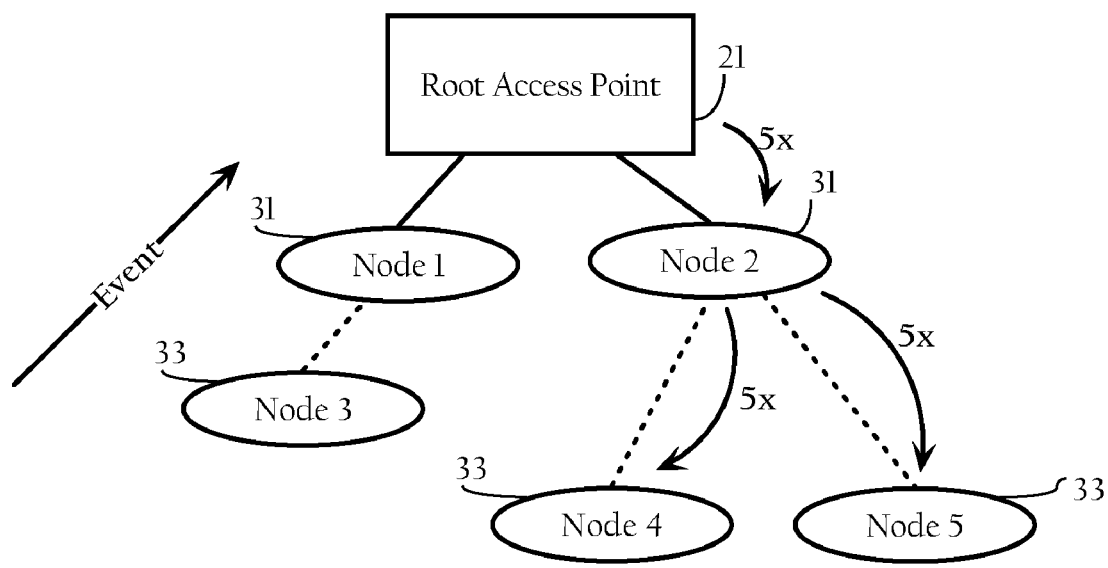
Fig._7

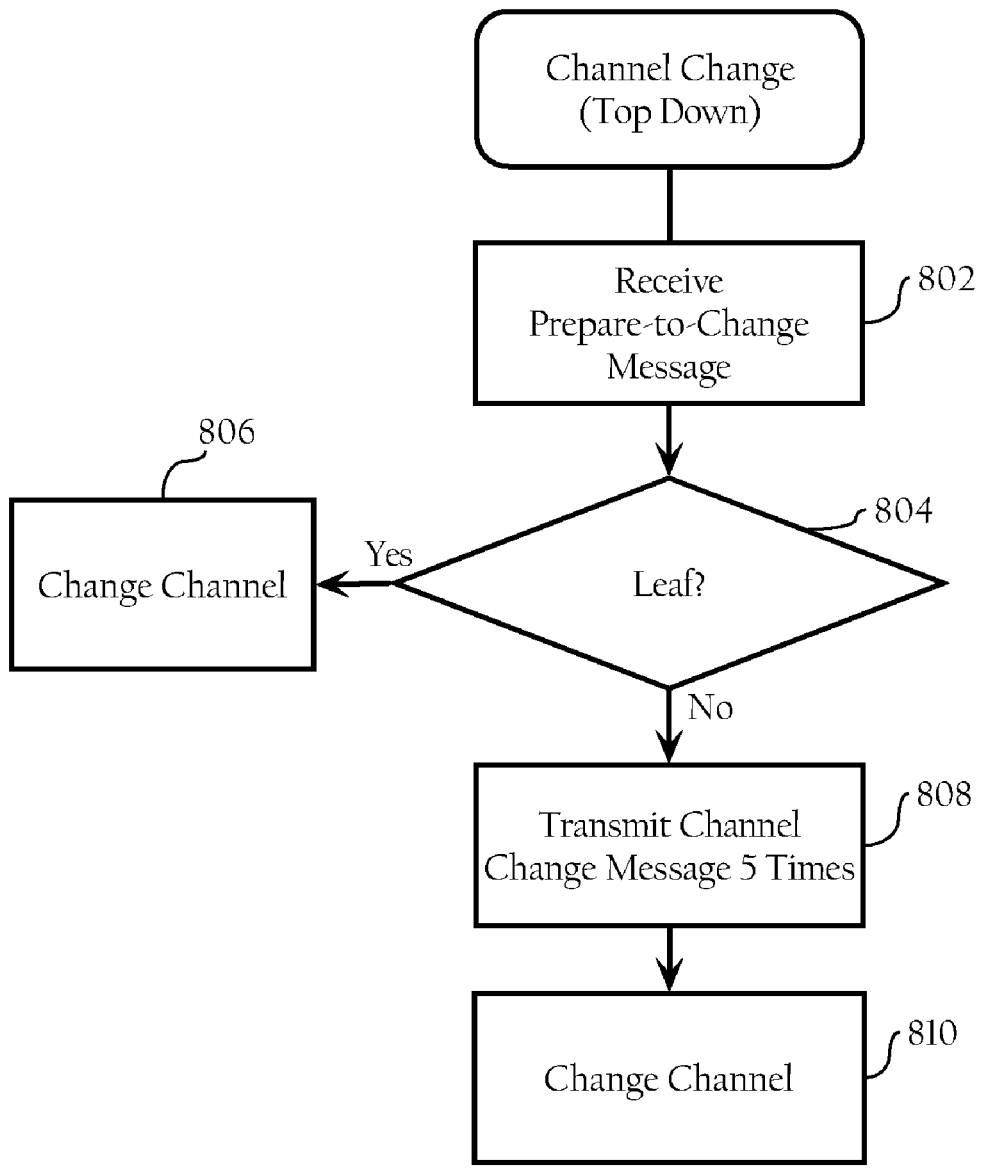
Fig._8

COORDINATED CHANNEL CHANGE IN MESH NETWORKS

TECHNICAL FIELD

The present disclosure relates generally to wireless mesh networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their networks.

Dynamic Frequency Selection (DFS) requirements give radar priority in wireless mesh network channels operating in the 5 GHz range. When a given wireless mesh node detects a radar signal on a given DFS channel, the wireless mesh node is required to move off that channel. In a mesh network not all mesh nodes may see particular radar signals, and therefore any detection of a radar signal needs to be signaled throughout the mesh network. Further, rather than stopping the use of a DFS channel when a mesh node detects radar, a DFS mechanism should trigger the mesh node to change channels to one that is known to be free of radar signals. One of the main advantages of mesh networks is their ability to re-configure themselves in response to a loss of nodes, interference, changing traffic conditions, etc. Such changes may require changing the frequency of operation of one or more links in the network. In networks with a single backhaul radio, a whole sub-tree rooted at a gateway node may have to change frequency. Changing channels, however, presents a risk in terms of loss of connectivity when errors occur.

DESCRIPTION OF THE DRAWINGS

FIG. 1 illustrates a wireless mesh network according to one implementation of the present invention.

FIG. 2A illustrates the logical relationship between mesh access points and controller 20 relative to wireless clients, according to one possible implementation of the invention.

FIG. 2B illustrates an example hardware system 100, which may be used to implement a controller 20.

FIG. 6 illustrates an example process flow implemented at a child node and associated with a bottom-up channel change.

FIG. 7 is an example hierarchy of the mesh access points.

FIG. 8 illustrates an example process flow associated with a top-down channel change.

DESCRIPTION OF EXAMPLE EMBODIMENTS

A. Overview

Figure 3:
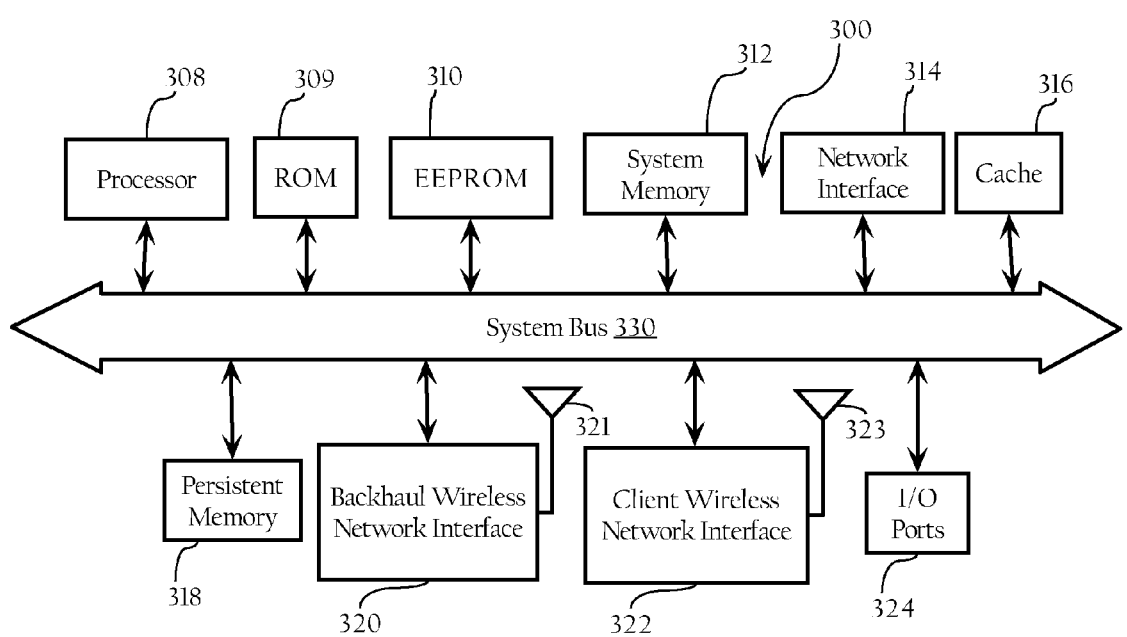
FIG. 3 illustrates for didactic purposes a hardware system, which may be used to implement a wireless mesh access point in a wireless mesh network.

Particular implementations facilitate channel changes in wireless mesh networks. According to particular implementations, when a given mesh node detects an event (such as a Dynamic Frequency Selection (DFS) event), the mesh node signals the root node or a controller. The root node or controller re-computes one or more channel assignments for the mesh network and assigns the new channel(s) to the appropriate mesh nodes. In one implementation, the wireless mesh achieves the channel change using a protocol where a given parent node and child node exchange messages before changing channels. While the channel assignment messages initially flow from the root node down to the leaf nodes, execution of the channel change protocol begins at the leaf nodes and then propagates up toward the root node. To ensure continuous connectivity, a number of messages may be exchanged between each parent-child pair before they switch channels.

In another implementation, after the root node selects one or more channels for the mesh network, the root node initiates a top-down channel change protocol. In a particular implementation, after the root node receives a DFS event, the root node transmits channel change messages to its child nodes multiple times before switching to a designated channel. Each child node in turn transmits the channel change message to its child nodes multiple times. This process continues down to the leaf nodes until all of the mesh nodes have switched to the designated channel. The channel change protocols described herein may be applied to various types of networks, such as mesh networks, to facilitate continuous connectivity.

B. Example Wireless Mesh Network System Architecture

B.1. Network Topology

FIG. 1 illustrates a wireless mesh network according to one implementation of the present invention. In one implementation, the wireless mesh network includes a wireless mesh controller 20, a root access point 21, and a plurality of child wireless mesh access points. In one implementation, the mesh access points are logically arranged in a hierarchy for purposes of routing traffic to the root access point (RAP), and on to a network. In one implementation, this hierarchy can be dynamically configured and shifted through the exchange of wireless management messages between wireless mesh access points, or statically configured.

In one implementation, a hierarchical architectural overlay is imposed on the mesh network of routing nodes to create a downstream direction towards leaf routing nodes 35, and an upstream direction toward the root access point 21. For example, in the hierarchical mesh network illustrated in FIG. 1, first hop mesh access point 31 is the parent of intermediate mesh access point 33. In addition, intermediate mesh access points 33 and 34 are the parent to leaf mesh access point 35. In one implementation, this hierarchical relationship is used in routing packets between wireless clients 60, or between wireless clients 60 and network 30. Of course, a variety of wireless mesh network configurations are possible, including non-hierarchical configurations, and hierarchical configurations with fewer or greater number of hierarchical tree structures.

The mesh access points in the mesh network, in one implementation, generally include one radio, operating in a first frequency band, and associated wireless communication functionality to communicate with other mesh access points to thereby implement the wireless backbone, as discussed more fully below. All or a subset of the mesh access points, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each mesh access point may interact with wireless clients on the 2.4 GHz band (802.11b/g). Of course, this relation can also be reversed with backhaul traffic using the 802.11b/g frequency band, and client traffic using the 802.11a band. In addition, the mesh access points may include only a single radio for client and backhaul traffic, or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parents nodes in the routing hierarchy.

B.2. Central Controller

FIG. 2A illustrates the logical relationship between mesh access points and controller 20 relative to wireless clients, according to one possible implementation of the invention. In one implementation, the mesh access points, in connection with the controller 20, implement a hierarchical processing scheme for management of wireless connections with clients 60. For example, each mesh access point may be configured to autonomously implement time-critical link layer functions (such as transmitting acknowledgements), while encapsulating and forwarding wireless management frames (e.g., association requests, etc.) and other client traffic to controller 20 for processing. The encapsulated frames may traverse one or more intermediate mesh access points in the mesh hierarchy as indicated by FIG. 2A.

In other implementations, the controller 20 may be implemented as a wireless domain management server (WDMS). If the controller 20 is implemented as a WDMS, the functionality implemented by the mesh access points may comprise the full range of processing functions for wireless data frames as well wireless management frames (e.g., association requests, etc.) and other client traffic. Of course, a variety of other mesh routing and control schemes can be used in connection with the real-time transport protocol described herein.

FIG. 2B illustrates an example hardware system 100, which may be used to implement a controller 20. As FIG. 2B shows, in one implementation, the central controller 20 includes a network interface 102. Controller 20, in one implementation, further comprises a processor 106, a memory 108, one or more software modules stored in memory 108, including instructions for performing the functions described herein, and a system bus 110 operably connecting these components. The central control elements may optionally include an administrative port 112 allowing for administrative access for such purposes as configuration and diagnostic access.

B.3. Wireless Mesh Access Point

FIG. 3 illustrates for didactic purposes a hardware system, which may be used to implement a wireless mesh access point in a wireless mesh network. In one implementation, the wireless mesh access point 300 comprises a processor 308, a read-only memory (ROM) 309, and an electronically erasable read-only memory (EEPROM) 310. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The backhaul wireless network interface 320 and client wireless network interface 322 may be radio interfaces. The wireless mesh access point 300 may also include input/output (I/O) ports 324 and a system bus 330 interconnecting these components.

In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging, Lightweight Access Point Protocol (LWAPP), Cisco®Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, one or more of these software components are loaded into system memory 312 and then accessed and executed by processor 310. In one implementation, the wireless mesh access point 300 includes software or firmware modules for recognizing the reception of network management information and for storing such information in memory (e.g., EEPROM 310).

C. Example Hierarchy of Mesh Access Points

Figure 4:
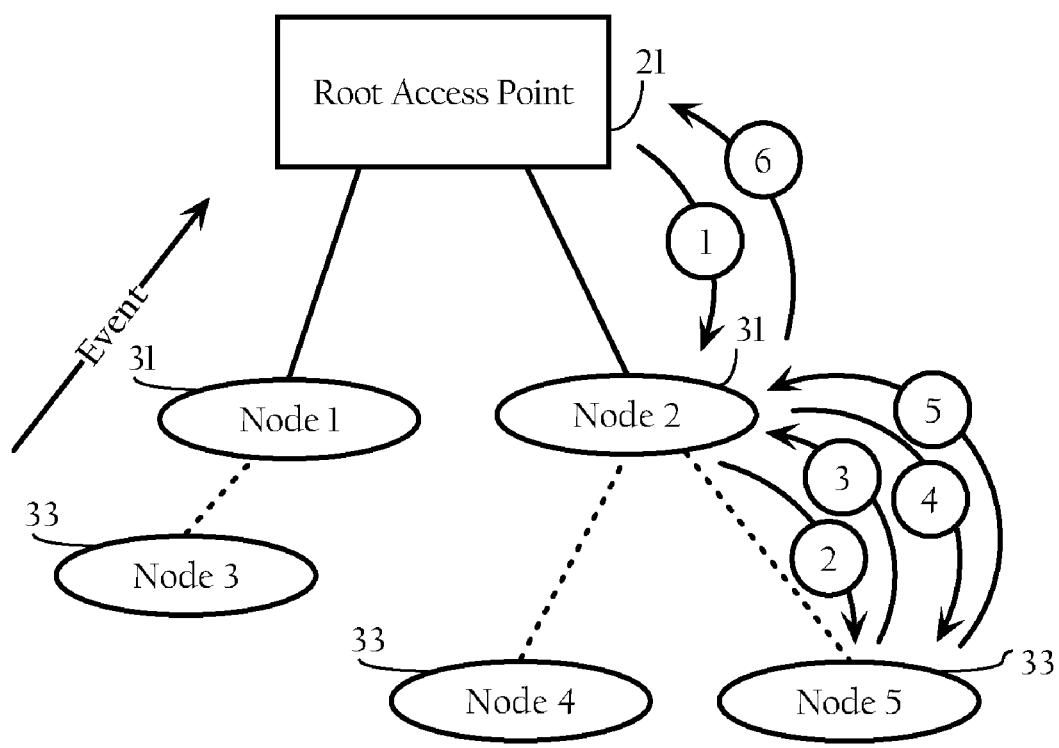
FIG. 4 is an example hierarchy of the mesh access points.

FIG. 4 is an example hierarchy of the mesh access points to explain operation of certain embodiments of the invention. The hierarchy includes root access point 21, mesh access point 1 31 (labeled Node 1), mesh access point 2 31 (labeled Node 2), mesh access point 3 33 (labeled Node 3), mesh access point 4 33 (labeled Node 4), and mesh access point 5 33 (labeled Node 5).

In operation, generally, when one or more of the mesh access points (e.g., mesh access point 3 33) detects an event, the mesh access point signals the root access point 21 or controller 20. In one implementation, the event may be a DFS event (e.g., detection of radar). In one implementation, DFS detection events flow upward from child nodes to the parent nodes and eventually reach the top or root node (in implementations, where controller 20 is separate from the root node). In one implementation, each parent node may apply filtering rules to received events so as to improve the detection process in terms of accuracy and reducing false alarms. For example, in one implementation, the controller 20 may initiate a channel change if two or more mesh access points detect a DFS event within a threshold window of time.

While an event may be a DFS event, the event may be any type of event such as a reconfiguration, a node failure, a command issued by a network administrator, etc. The root access point 21 then recomputes one or more channel assignments for the mesh network and assigns the new channel(s) to the mesh access points. In one implementation, all mesh access points operate on the same channel. In other implementations, the mesh access points operate on different channels. For example, a give mesh access point may include a parent radio tuned to a first channel, and a child radio tuned to a second channel. A channel change in a mesh network means that a given node may have to change either the parent channel, the child channel or both. In particular implementations, the wireless mesh network achieves a channel change using a protocol that is implemented between parent nodes and child nodes. The channel change protocols described herein may apply to both single channel and multi-channel networks. In one implementation, the channel change can be for one channel for the entire mesh network or for one or more channels of many channels.

In one implementation, the root access point 21 or controller 20 initiates the channel change by transmitting channel assignment messages that propagate down to the leaf nodes of the mesh network. In one implementation, the leaf nodes execute a channel change, which execution propagates up towards the root access point 21. The messages used to execute a change between two mesh nodes can belong to the class of adjacency protocols executed between mesh nodes. Examples of the channel change protocol are described in more detail below. For ease of illustration, the following descriptions address scenarios where one channel is being changed throughout the mesh network.

D. Channel Change Protocol

As described herein, a channel change may be initiated in response to an event such as detection of radar signals in a DFS band. As FIG. 4 shows, a mesh access point 33 (Node 3) may detect an event and transmit a notification toward the root access point. FIG. 4 shows an example message flow across a portion of the mesh network that may result as part of execution of a bottom-up channel change protocol.

D.1. Bottom-up Channel Change Protocol

Figure 5:
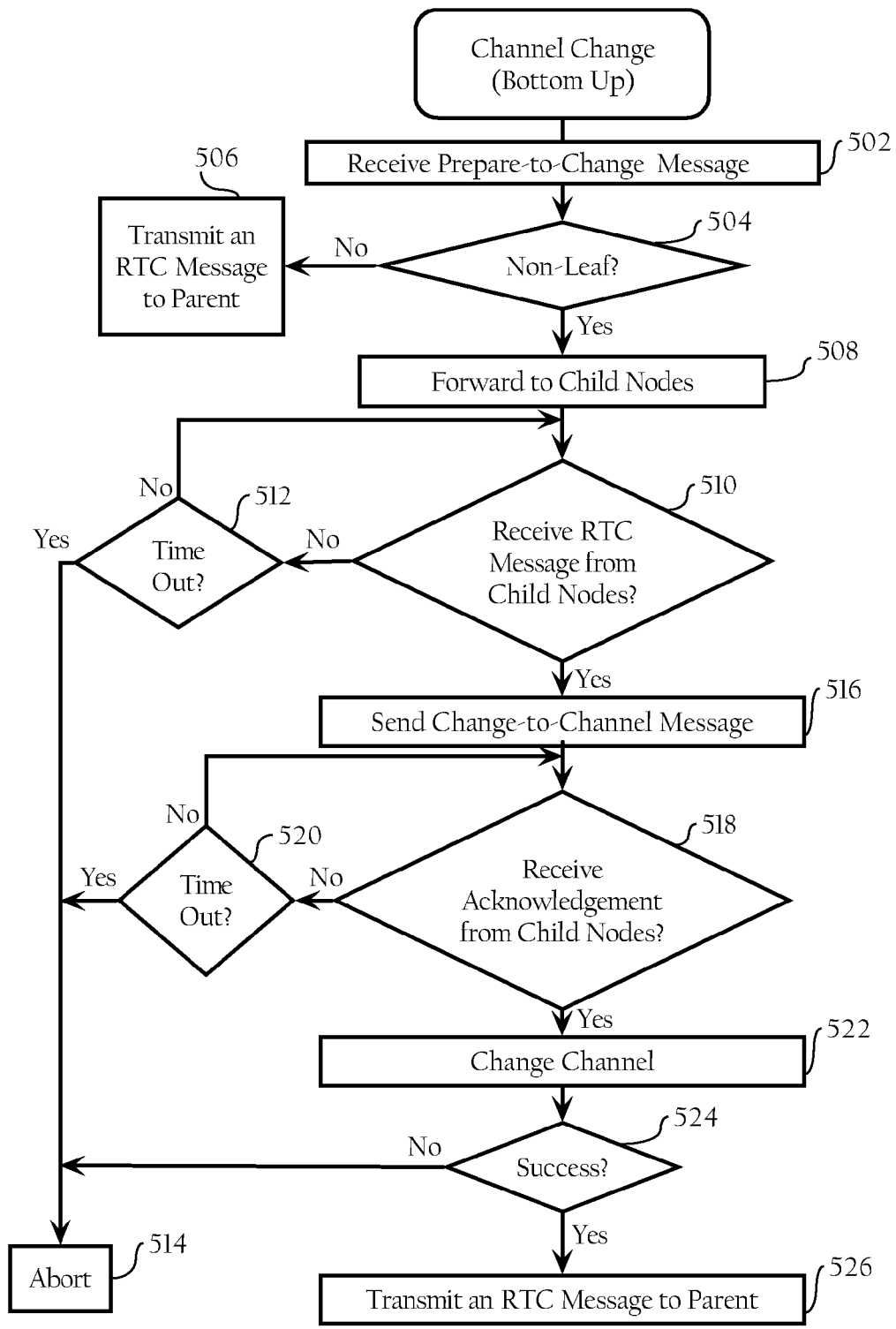
FIG. 5 illustrates an example process flow associated with a bottom-up channel change.

FIG. 5 illustrates an example process flow associated with a bottom-up channel change. Referring to both FIGS. 4 and 5, a mesh access point 31 (Node 2) receives a prepare-to-change message from the root access point 21 (502), where the prepare-to-change message includes instructions to prepare to change channels and includes a designated channel. If mesh access point 2 31 is a leaf node (504), mesh access point 2 31 transmits a ready-to-change message (506) to its parent node, where the ready-to-change message is a channel change notification that indicates that mesh access point 2 31 is ready to change channels. If mesh access point 2 31 is not a leaf node, mesh access point 2 31 forwards the prepare-to-change message to its child nodes 33 (508). As FIG. 4 illustrates, the prepare-to-change message, as a result of these decisional steps, propagates down to the leaf node 33 (Node 5) (FIG. 4, Ref. Nos. 1 & 2). For ease of illustration, the remainder of this process flow is described with respect to child node 5 33. The same process flow applies to all of mesh access point's 31 child nodes.

Next, mesh access point 2 31 determines if it has received a ready-to-change message from child node 5 33 (510), where the ready-to-change message indicates that the child node 5 33 is ready to change channels (see FIG. 4, Ref. No. 3). If mesh access point 2 31 does not receive a ready-to-change message and there is a time out (512), mesh access point 2 31 aborts the process (514). In one implementation, mesh access point 2 31 sends an abort message to the child node 5 33. In one implementation, if the channel change fails and mesh access point 2 31 aborts the process, the child node 5 33 may perform a default recovery procedure (e.g., switch to a bootstrap channel or scan all channels for a new parent). If mesh access point 2 31 receives a ready-to-change message, the mesh access point sends a message to child node 5 33 to switch to the designated channel (516) (FIG. 4, Ref. No. 4).

Mesh access point 2 31 determines if it has received an acknowledgement message from child node 5 33 (518) (FIG. 4, Ref. No. 5). If mesh access point 2 31 does not receive an acknowledgement message from child node 5 33 and there is a time out (520), mesh access point 2 31 aborts the process (514). If mesh access point 2 31 receives an acknowledgement message, mesh access point 2 31 changes to the designated channel with respect to the child node 5 33 (522).

Next, mesh access point 2 31 determines if it is successful in changing the channel (i.e., there is successful connectivity between mesh access point 2 31 and the child node 5 33) (524). After switching to the new channel, the child node 5 33 polls (probes) mesh access point 2 31 to see if it has also switched. If mesh access point 2 31 is not successful in changing the channel, mesh access point 2 31 aborts the process (514). If mesh access point 2 31 is successful, mesh access point 2 31 transmits a ready-to-change message to its parent (526) (FIG. 4, Ref. No. 6), which initiates a similar process and message flow. Mesh access point 31 then follows a channel changing process similar to child node 5 33.

FIG. 6 illustrates an example process flow implemented at a child node and associated with a bottom-up channel change. As FIG. 6 shows, child node 5 33 receives a message from its parent node 33 to change to a designated channel (602). Child node 5 33 then transmits a response to the parent node 33 (604). The child node 5 33 then changes to the designated channel (606). In one embodiment, after changing to the designated channel, child node 5 33 sends a probe to the parent. Child node 5 33 then determines if the parent node has responded to the probe (608). If not, child node 5 33 initiates a failure recover process (610). Various failure recovery processes are possible. For example, a failure may cause both parent and child nodes to revert back to the old channel. If that fails, the child node may revert to a back-up configuration (e.g., a bootstrap channel) or do an exhaustive channel scan to identify potential parent nodes. If the parent has responded to the probe, child node 5 33 continues with its normal processes. D.2. Top-Down Channel Change FIG. 7 illustrates an example message flow in an example hierarchy of the mesh access points according to a top-down channel change protocol. In one embodiment, when one or more of the mesh access points (e.g., mesh access point 4 33) detects an event such as a DFS event, the mesh access point signals the root access point 21. As described in more detail below in connection with FIG. 8, after the root access point 21 recomputes one or more channel assignments for the mesh network, the root access point 21 implements a top-down channel change mechanism.

FIG. 8 illustrates an example process flow associated with a top-down channel change. Referring to both FIGS. 7 and 8, mesh access point 2 31 receives a prepare-to-change message from the root access point 21 multiple times (802). If mesh access point 2 31 is a leaf node (804), mesh access point 2 31 changes channels (806). If mesh access point 2 31 is not a leaf node, mesh access point 2 31 transmits a channel change message to its child nodes multiple times (808). In one implementation, mesh access point 2 31 transmits a channel change for a predefined number of times (e.g., 5 times) in predefined intervals (e.g., a beacon interval). Mesh access point 2 31 then changes the channel to a designated channel (810). In one implementation, if the channel change fails, child node 5 33 may perform a recovery procedure (e.g., default to a suitable default channel or perform a neighbor scan to find a parent).

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A method comprising:
    receiving, at a first mesh routing node, a prepare-to-change message from a parent node of the first mesh routing node, wherein the prepare-to-change message indicates instructions to prepare to change channels and includes a designated channel;
    forwarding from the first mesh routing node the prepare-to-change message to one or more child nodes of the first mesh routing node;
    receiving a ready-to-change message from the one or more child nodes;
    transmitting a change-to-channel message to the one or more child nodes, wherein the change-to-channel message indicates instructions to switch to the designated channel;
    receiving an acknowledgement message from the one or more child nodes;
    changing, responsive to the acknowledgement message, to the designated channel;
    determining if there is successful connectivity between the first mesh routing node and the one or more child nodes after changing to the designated channel; and
    if there is successful connectivity, transmitting a ready-to-change message to the parent node.

2. The method of claim 1 further comprising:
    receiving a change-to-channel message from the parent node, wherein the change-to-channel message indicates instructions to switch to the designated channel;
    transmitting a response to the parent node; and
    changing to the designated channel.

3. The method of claim 2 further comprising:
    determining if the parent node has responded to a probe; and
    if the parent node has not responded to the probe, initiating a failure recovery process.

4. The method of claim 3 wherein the failure recover process comprises performing a neighbor scan to find a parent.

5. The method of claim 1 further comprising detecting an event and transmitting an event notification to a root node of a hierarchical wireless mesh network.

6. A mesh routing node, comprising:
    one or more processors;
    a memory;
    one or more wireless network interfaces; and
    logic encoded in one or more tangible media for execution and when executed operable to cause the one or more processors to:
    receive a prepare-to-change message from a parent node of the mesh routing node, wherein the prepare-to-change message indicates instructions to prepare to change channels and includes a designated channel;
    forward the prepare-to-change message to one or more child nodes of the mesh routing node;
    receive a ready-to-change message from the one or more child nodes;
    transmit a change-to-channel message to the one or more child nodes, wherein the change-to-channel message indicates instructions to switch to the designated channel;
    receive an acknowledgement message from the one or more child nodes;
    change, responsive to the acknowledgement message, to the designated channel;
    determine if there is successful connectivity between the mesh routing node and the one or more child nodes after changing to the designated channel; and
    if there is successful connectivity, transmit a ready-to-change message to the parent node.

7. The apparatus of claim 6 wherein the logic is further operable to cause the one or more processors to:
    receive a change-to-channel message from the parent node, wherein the change-to-channel message indicates instructions to switch to the designated channel;
    transmit a response to the parent node; and
    change to the designated channel.

8. The apparatus of claim 7 wherein the logic is further operable to cause the one or more processors to:
    determine if the parent node has responded to a probe; and
    if the parent node has not responded to the probe, initiate a failure recovery process.

9. The apparatus of claim 8 wherein the failure recover process comprises performing a neighbor scan to find a parent.

10. The apparatus of claim 6 wherein the logic is further operable to cause the one or more processors to detect an event and transmitting an event notification to a root node of a hierarchical wireless mesh network.

11. A non-transitory storage medium comprising computer-readable instructions encoded thereon, the instructions operative when executed to cause a processor to:
    receive, at a mesh routing node, a prepare-to-change message from a parent node of the mesh routing node, wherein the prepare-to-change message indicates instructions to prepare to change channels and includes a designated channel;
    forward the prepare-to-change message to one or more child nodes of the mesh routing node;
    receive a ready-to-change message from the one or more child nodes;
    transmit a change-to-channel message to the one or more child nodes, wherein the change-to-channel message indicates instructions to switch to the designated channel;
    receive an acknowledgement message from the one or more child nodes;
    change, responsive to the acknowledgement message, to the designated channel;
    determine if there is successful connectivity between the mesh routing node and the one or more child nodes after changing to the designated channel; and
    if there is successful connectivity, transmit a ready-to-change message to the parent node.

* * * * *